US011176467B2

(12) United States Patent
Antonatos et al.

(10) Patent No.: US 11,176,467 B2
(45) Date of Patent: Nov. 16, 2021

(54) PRESERVING DATA SECURITY IN A SHARED COMPUTING FILE SYSTEM

(71) Applicant: INTERNATIONAL BUSINESS MACHINES CORPORATION, Armonk, NY (US)

(72) Inventors: Spyridon Antonatos, Dublin (IE); Stefano Braghin, Dublin (IE); Konstantinos Katrinis, Stamata Attikis (GR); Andrea Reale, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/373,418

(22) Filed: Apr. 2, 2019

(65) Prior Publication Data

US 2020/0320406 A1 Oct. 8, 2020

(51) Int. Cl.
G06N 5/04 (2006.01)
G06N 20/00 (2019.01)
G06N 5/02 (2006.01)
G06F 21/62 (2013.01)

(52) U.S. Cl.
CPC .......... *G06N 5/04* (2013.01); *G06F 21/6254* (2013.01); *G06N 5/025* (2013.01); *G06N 20/00* (2019.01)

(58) Field of Classification Search
CPC ...... H04L 63/0227; G06N 5/04; G06N 20/00; G06N 5/025; G06F 21/6254
See application file for complete search history.

(56) References Cited

U.S. PATENT DOCUMENTS

| 9,779,260 | B1* | 10/2017 | Brisebois | ............ G06F 21/6227 |
|---|---|---|---|---|
| 10,051,001 | B1* | 8/2018 | Ashley | .................... H04L 63/14 |
| 2005/0071650 | A1* | 3/2005 | Jo | ........................ H04L 63/1425 |
| | | | | 713/188 |
| 2005/0251865 | A1 | 11/2005 | Mont et al. | |
| 2012/0030165 | A1 | 2/2012 | Guirguis et al. | |
| 2013/0066893 | A1 | 3/2013 | Humprecht | |
| 2014/0344958 | A1 | 11/2014 | Boukobza | |
| 2017/0083708 | A1 | 3/2017 | Braghin et al. | |
| 2018/0025179 | A1 | 1/2018 | Spyridon et al. | |

OTHER PUBLICATIONS

Redacting with Confidence: How to Safely Publish Sanitized Reports Converted From Word to PDF, Aug. 26, 2018 (14 Pages).
"Sanitization (classified information)" as edited by Donner60 (talk | contribs), Jun. 3, 2018 (4 Pages).
Redacting with Confidence: How to Safely Publish Sanitized Reports Converted From Word to PDF Architectures and Applications Division of the Systems and Network Attack Center (SNAC) Information Assurance Directorate, Dec. 13, 2005 (14 Pages).

* cited by examiner

*Primary Examiner* — Oleg Korsak
(74) *Attorney, Agent, or Firm* — Griffiths & Seaton PLLC

(57) ABSTRACT

Various embodiments are provided for providing data security in a computing environment are provided. Data may be inspected during a write operation or a read operation and selected data from the data may be filtered according to one or more data security policies or rules prior to sending the plurality of data to or receiving the plurality of data from a shared computing file system.

17 Claims, 8 Drawing Sheets

PRESERVING DATA SECURITY IN A SHARED COMPUTING FILE SYSTEM

BACKGROUND OF THE INVENTION

Field of the Invention

The present invention relates in general to computing systems, and more particularly to, various embodiments for preserving data security in a shared computing file system using a computing processor.

Description of the Related Art

In today's interconnected and complex society, computers and computer-driven equipment are more commonplace. Processing devices, with the advent and further miniaturization of integrated circuits, have made it possible to be integrated into a wide variety of devices. The advent of computers and networking technologies have made possible the intercommunication of people from one side of the world to the other. However, ensuring data integrity and security are a continuous challenge to address.

SUMMARY OF THE INVENTION

Various embodiments for preserving data security in a shared computing file system in a computing environment are provided. In one embodiment, by way of example only, a method for preserving data security in a shared computing file system, by a processor, is provided. Data may be inspected during a write operation or a read operation and selected data from the data may be filtered according to one or more data security policies or rules prior to sending the plurality of data to or receiving the plurality of data from a shared computing file system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
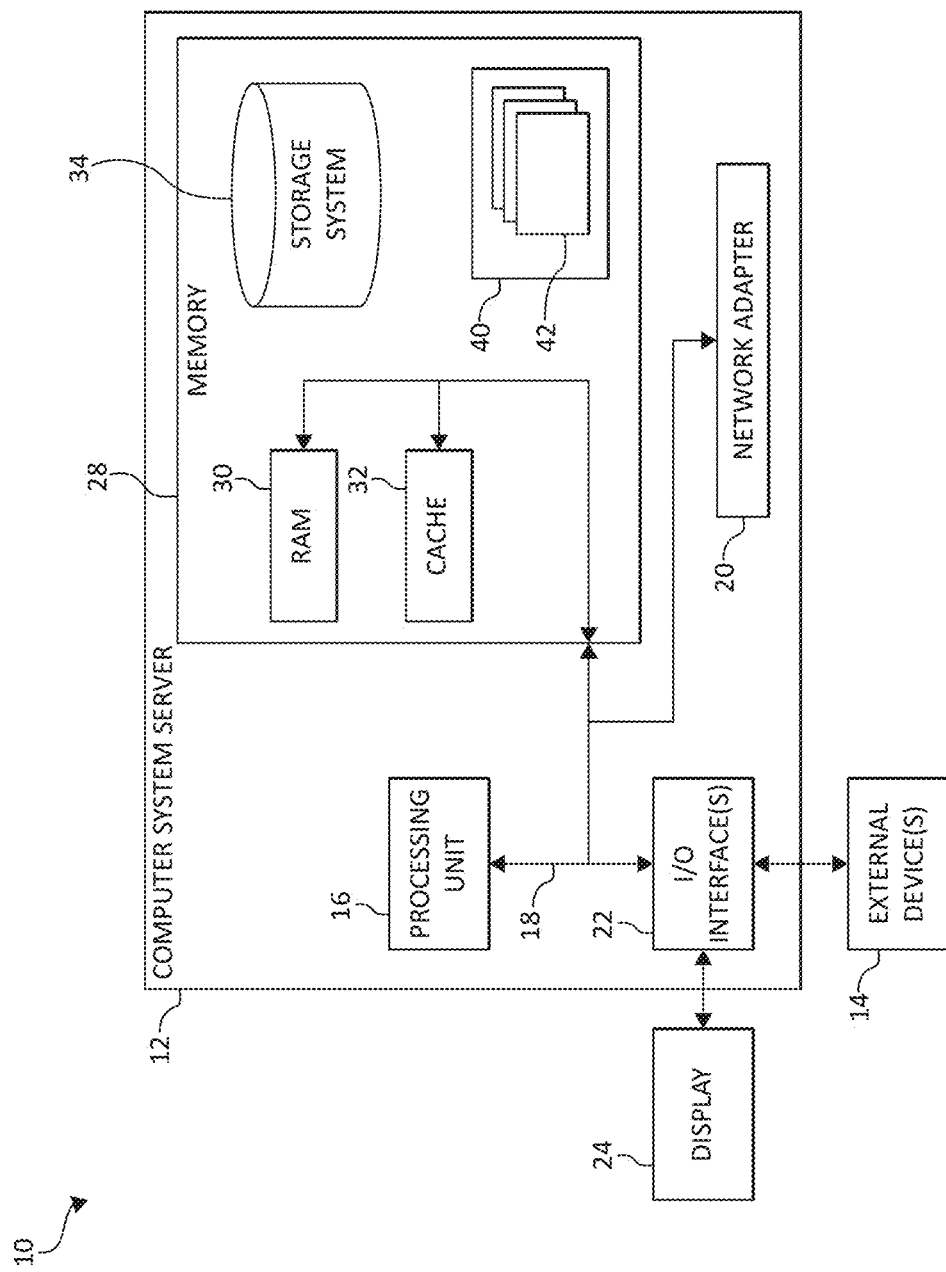
FIG. 1 is a block diagram depicting an exemplary cloud computing node according to an embodiment of the present invention.

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal (e.g., personal identifiable information "PII") and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. This type of data is often considered as private and confidential and should be protected from access by unauthorized users.

Some data breaches to private, sensitive and/or proprietary data may be due to unintended human error (e.g., misconfigurations, poor data governance), rather than attacks by rogue/outside hackers. Also, misconfigured applications are an ever present threat to confidentiality of sensitive data. Several approaches have been taken to address the issue, mainly through access control or encryption, hence by restricting who can access specific storage structures (e.g., partitions, mount points, directories, files and/or zones). However, such efforts are is still insufficient to protect the data. For example, protecting the security of data becomes a challenge when the data is intended to be shared among various principals in a platform such as, for example, data that is required to be accessible for various reasons (e.g., log files) or if the data may be stored in an unforeseen location (e.g., a node of a Hadoop cluster in a cloud computing environment). Furthermore, specific use cases may require data, which may contain sensitive information, to be accessible from different user(/roles) with different granularity/level of completeness. In one aspect, a different versions of the dataset may be created for each purpose. However, such approach is expensive or even impractical for large volumes of data. Thus, the present invention preserves and maintains data security in a shared computing file system. Selected data may be identified during a write operation or a read operation and enforcing one or more data security policies or rules on the selected data for ensuring data security on a shared computing file system.

In one aspect, the present invention protects personal, sensitive, and/or proprietary information stored on files by inspecting data upon a write and read operations at the file system level. In one aspect, the present invention leverages data type identification, de-identification and anonymization operations to ensure required security guarantees are maintained and ensured. That is, the mechanisms of the illustrated embodiments may intercept read/write operations (e.g., file system calls). For example, a "File System in Userspace" ("FUSE") interface may be used to create custom file systems. The present invention may receive the read/write operations from applications. Upon receiving a file system call, the present invention may inspect the content/context of the read and/or writes and determine whether the read and/or writes applies to any data record that is defined to be sensitive. Depending on the decisions, the read/write calls may be satisfied by either forwarding them as-is to an actual/real data store (e.g., where original data is maintained/kept) or by returning obfuscated/erased data to avoid unintentionally releasing/leaking sensitive information.

In one aspect, mechanisms of the illustrated embodiments may inspect the data prior to being committed to storage (e.g., local storage and/or remote storage) to ensure that no classified information (e.g., personal information, personal health information and/or any other sensitive information which may be herein referred to as "classified data") is released (e.g., leaked).

In an additional aspect, the present invention may use and/or apply one or more data security rules, policies, and/or requirements on data read to prevent unauthorized users to access selected data/raw data (e.g., classified/private data) by transforming sensitive data according to one or more data security rules, policies, and/or requirements. If the classified/private data is detected the present invention replaces the classified/private data (e.g., sensitive information) with non-classified/non-private data (e.g., non-sensitive information) preserving the data length and format of the original values. That is, a machine learning operation may perform one or more machine learning operations (e.g., natural language processing and/or artificial intelligence "AI" operations) to learn data that may be determined to be classified (e.g., private, personal, sensitive, and/or proprietary). The selected portion of data that is determined to be classified/private data may be filtered and/or anonymized.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
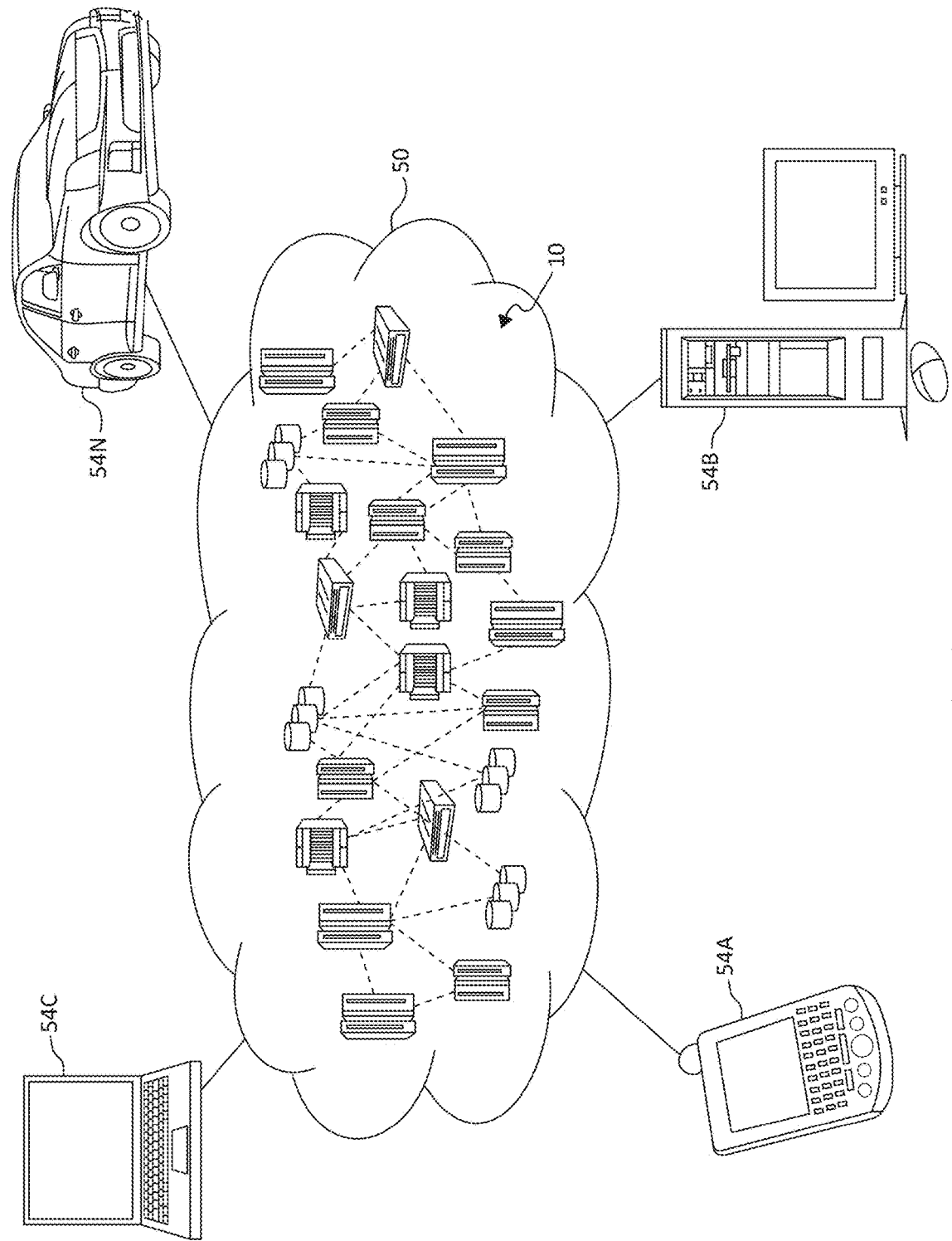
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
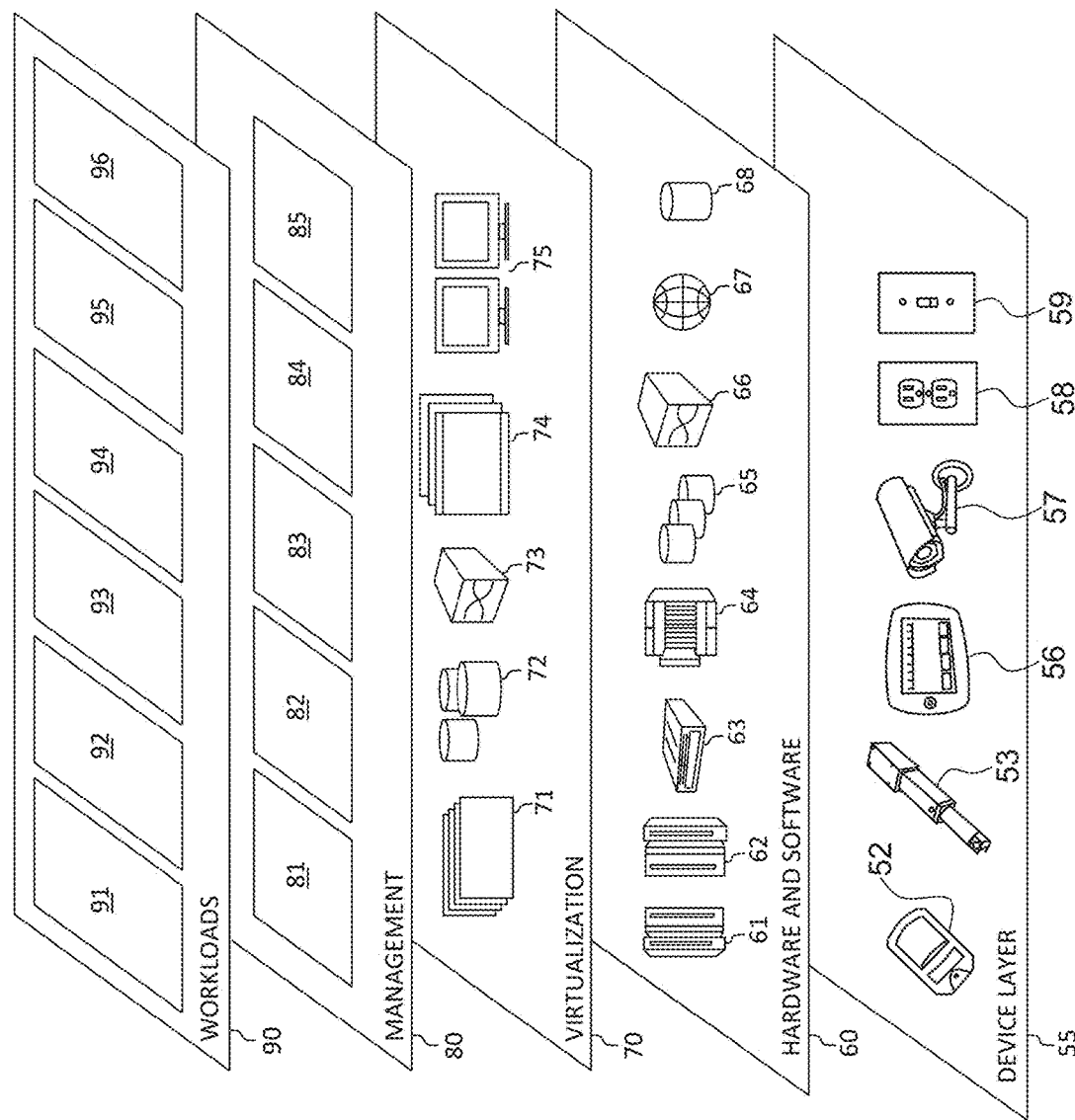
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for preserving data security. In addition, workloads and functions 96 for preserving data security may include such operations as data analysis (including data collection and processing) and data analytics functions. One of ordinary skill in the art will appreciate that the workloads and functions 96 for preserving data security may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for preserves and maintains data security in a shared computing file system. Selected data may be identified during a write operation or a read operation and enforcing one or more data security policies or rules on the selected data for ensuring data security on a shared computing file system.

In one aspect, the present invention may receive, interrupt, and/or intercept and act upon read and write system calls prior to reaching a computing storage system/device. In one aspect, the intercepting may be performed according to "Portable Operating System Interface" ("POSIX") standards that defines how to interact with operating systems ("OS") in a structured way. The present invention may identify and detect information (e.g., data that may be defined by a user or a machine learning operation that is private, personal, proprietary, and/or sensitive) and perform a data masking operation on the sensitive information. That is, the present invention may inspect a plurality of data during a write operation or a read operation and filtering selected data from the plurality of data according to one or more data security policies or rules prior to sending the plurality of data to or receiving the plurality of data from a shared computing file system.

For example, when a user writes a byte buffer, the present invention may inspect the content for potential information that may be data that may be defined by a set of rules/polies (which set of rules/polies may be user defined and/or learned via a machine learning operation) that is private, personal, proprietary, and/or sensitive). The inspection is may be performed by invoking one or more selected/appropriate file-format processor according to the data format provided by a file name and/or system configuration (i.e., which format will be stored in a given directory). That is, the present invention anticipates/expects that a format of the file (i.e. the binary structure and semantic (e.g., word processing document, portable document format "pdf," comma-separated values format, etc.)) is inferred either from system configuration, from file name (e.g., file extension), or using an AI/cognitive component that identifies the file format by inspecting the file itself.

In one aspect, the present invention may be included in a Hadoop File System ("HDFS"). For example, on a write operation, data may be processed by data type identification capabilities when submitted by a client to a first data node in the HDFS. If sensitive attributes are detected, the data may be processed at the first data node, so that replicas on other data nodes will not be affected by a possible delay. On a read operation, security protection may be enforced by having each data node in the HDFS inspect the requested data block prior to serving the data (which may include private/sensitive data) to the client. It should be noted that it may be required for the data node to query a name node to retrieve preceding and following data block (if any) in order to identify sensitive data that have been split between data blocks. It should also be noted that if the format of the data file is known, then it is possible to employ a custom data splitter operation to avoid such issue at the cost of a non-uniform distribution of data across data blocks. That is, any "record" (e.g., a coherent piece of information that can be stored in a file such as, for example, a credit card number or a line in a CSV file) can be split across more than one data block (i.e., a contiguous sequence of bytes of a file, which is the smallest unit of storage for HDFS). Data blocks belonging to the same file can be distributed across different data nodes. The name node is a directory of this information.

Figure 4:
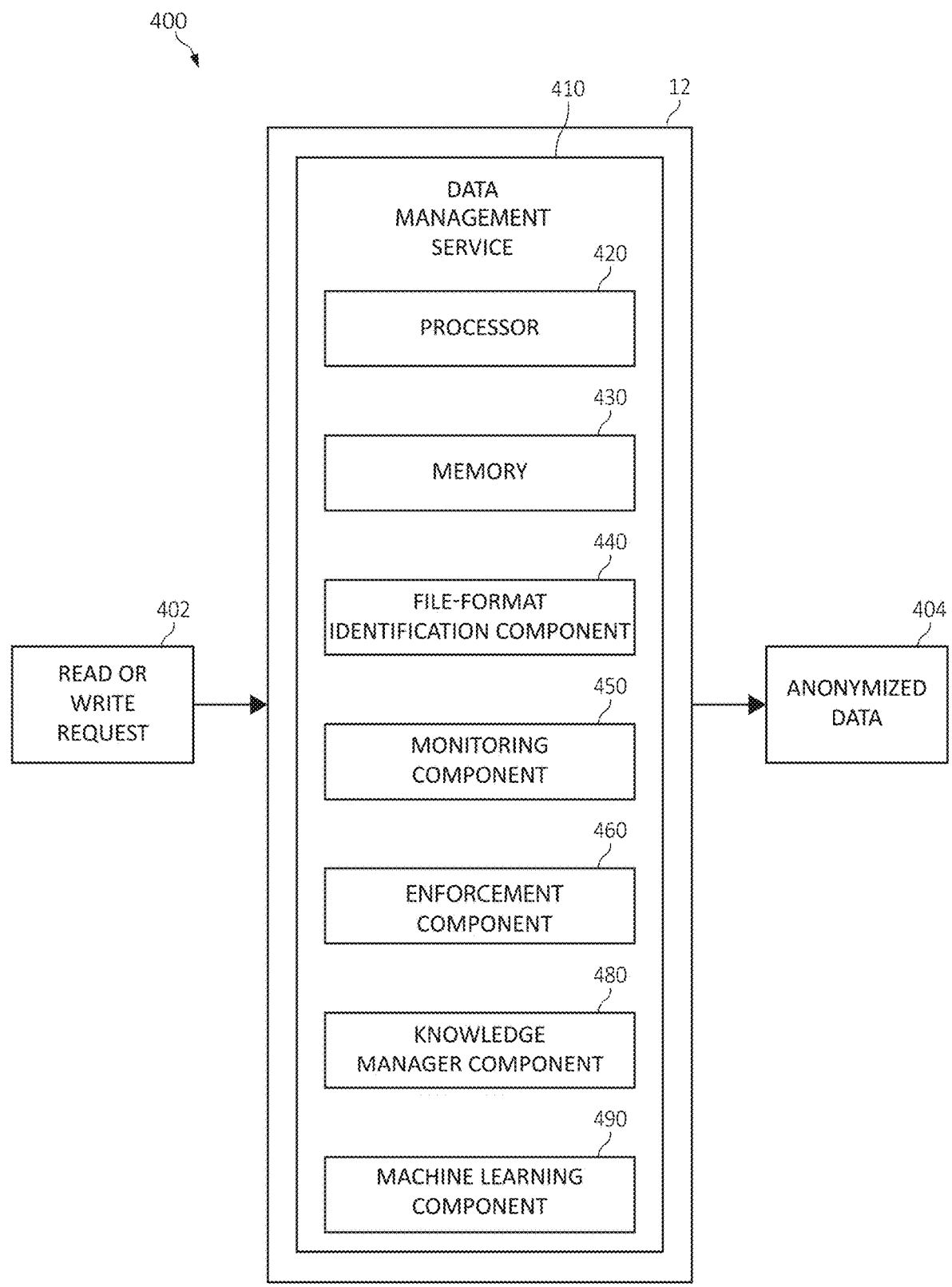
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown for preserving data security in a shared computing file system. In one aspect, one or more of the components, modules, services, applications, and/or functions described in FIGS. 1-3 may be used in FIG. 4.

A data management service 410 is shown, incorporating processing unit 420 to perform various computational, data processing and other functionality in accordance with various aspects of the present invention. The data management service 410 may be included in computer system/server 12, as described in FIG. 1. The processing unit 420 ("processor") may be in communication with memory 430.

The data management service 410 may also include a file-format identification component 440, a monitoring component 450, an enforcement component 460, knowledge manager component 480, and a machine learning component 490, each of which may be in communication with each other.

In one aspect, data management service 410 may in communication with and/or associated with one or more databases such as, for example, storage system 34 of FIG. 1, which may be internal to the data management service 410 or may be external to the data management service 410. For example, the storage system 34 of FIG. 1 may be a third-party database in communication with and/or associated with the data management service 410.

As one of ordinary skill in the art will appreciate, the depiction of the various functional units in data management service 410 is for purposes of illustration, as the functional units may be located within the data management service 410 or elsewhere within and/or between distributed computing components.

Responsive to receiving dataset 402 from a user and/or an enterprise, such as a healthcare company, the monitoring component 450 may analyze the data reads and/or writes (e.g., dataset 402) to identify, detect, analyze, and/or intercept classified/private data (e.g., personal or sensitive information). The monitoring component 450 intercepts each system call to read/write data blocks from a storage system and analyzes whether the data blocks to be returned contain information that implicates one or more data security policies or rules.

The knowledge manager 480 (e.g., a knowledge base manager) is in charge of serving and providing in a distributed manner the following information. 1) A set of security policies describing the type of classified/private data (e.g., personal, sensitive, proprietary information) that the system needs to protect. 2) A set of exceptions, i.e., cases in which the classified/private data (e.g., personal, sensitive, proprietary information) may be released. 3) A set of data enforcement/security enforcement rules describing how to process each type of classified/private data (e.g., personal, sensitive, proprietary information).

The file-format identification component 440 may receive one or more instructions from the knowledge manager component 480 about a format of data/files that will be read/written. Alternatively, the file-format identification component 440 may infer a format of the data/files from one or more operations such as, for example, inspecting the magic number, leveraging file name information (e.g., extension), and/or a best practice operation (e.g., format of log files. This information is then used to assist the monitoring component 450 to parse the data involved in according to the file format. The magic number is a known value that may be stored in the first bytes of a file to indicate the byte structure and semantic of the remainder of the file. It should be noted that the magic number may be used in various file formats, but it is not a mandatory. Also, in relation to the best practice operation, in some file systems of an OS, log files may be stored in one or more log directories. This gives a hint of the file format because standard file logger records information following defined structure. Similar to the format of logd, the daemon may be used to log in to various OSs or syslogd (e.g., messaging logging), and another logger (e.g., a command line utility to send messages to a log) for a different OS environment.

The enforcement component 460 may transform (e.g., filter, anonymize, replace, data mask, etc.) the classified/private data (e.g., personal, sensitive, proprietary information) while maintaining and preserving the data/file format (e.g., preserve the data structure and size), which may be the anonymized/filtered data 404. For example, the enforcement component 460 may filter or perform a data anonymization operation (e.g., data masking, k-anonymity, differential security, etc.) on the dataset 402 to produce the anonymized/filtered data 404. The enforcement component 460 may, upon invocation from the monitoring component 150, apply the required transformations to the data blocks to be read/written according to the requirements as specified in the knowledge base manager.

The machine learning component 490 may learn the various classified/private data (e.g., personal, sensitive, proprietary information) for each type of user and/or entity (e.g., government, business, organization, academic institution, etc.) and assist the knowledge manager 480 to identify, detect, analyze, and/or intercept classified/private data (e.g., personal or sensitive information). In one aspect, machine learning component 490 may include and/or access a knowledge domain that may include a variety of knowledge data such as, for example, data relating to the various classified/private data for each type of user and/or entity (e.g., government, business, organization, academic institution, etc.).

In one aspect, the various machine learning operations of the machine learning component 490, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

As one of ordinary skill in the art will appreciate, the data management service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
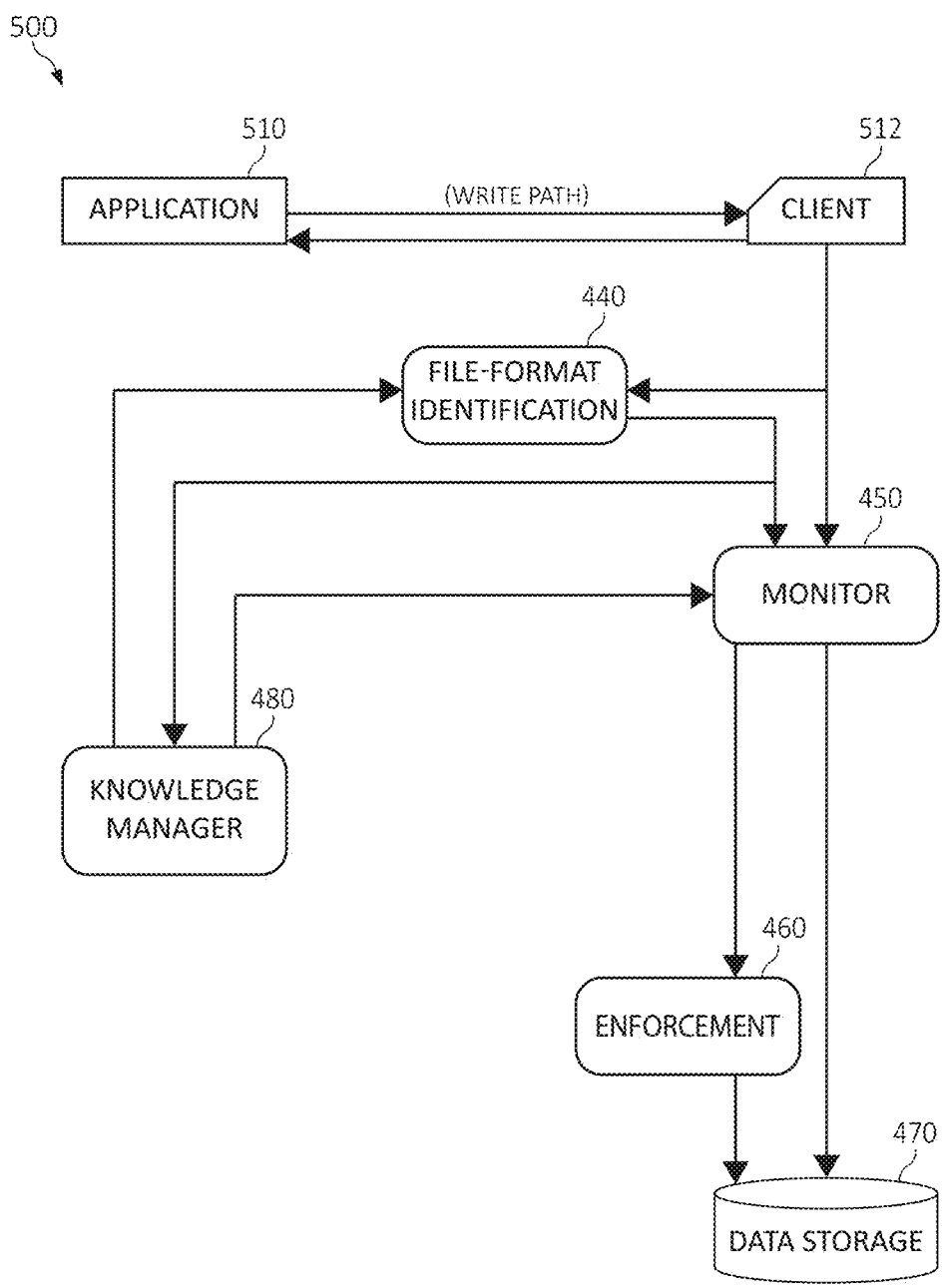
FIG. 5 is a diagram depicting exemplary operations for preserving data security in a shared computing file system for a write operation in accordance with aspects of the present invention.
Figure 6:
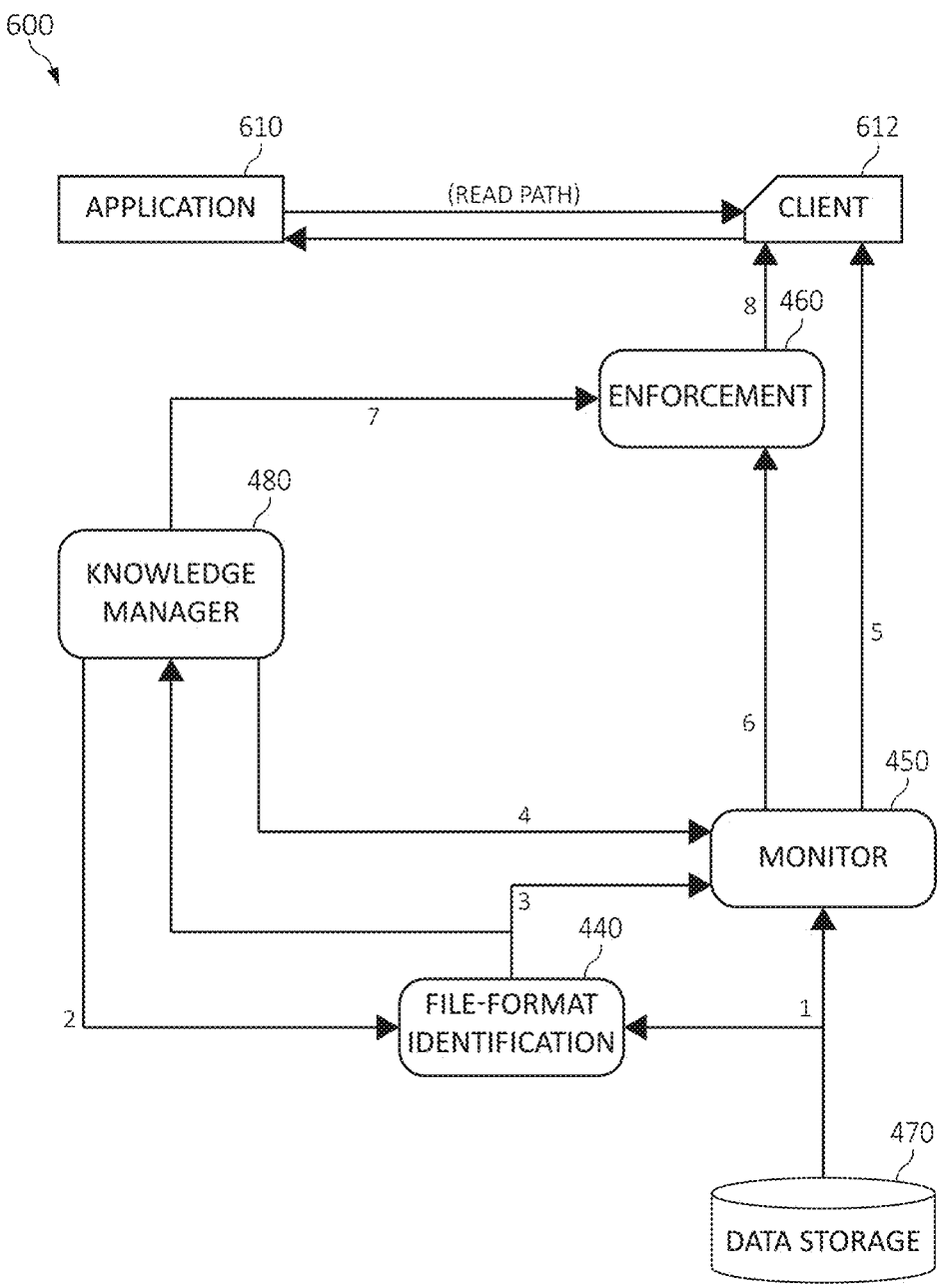
FIG. 6 is a diagram depicting exemplary operations for preserving data security in a shared computing file system for a read operation in accordance with aspects of the present invention.
Figure 7:
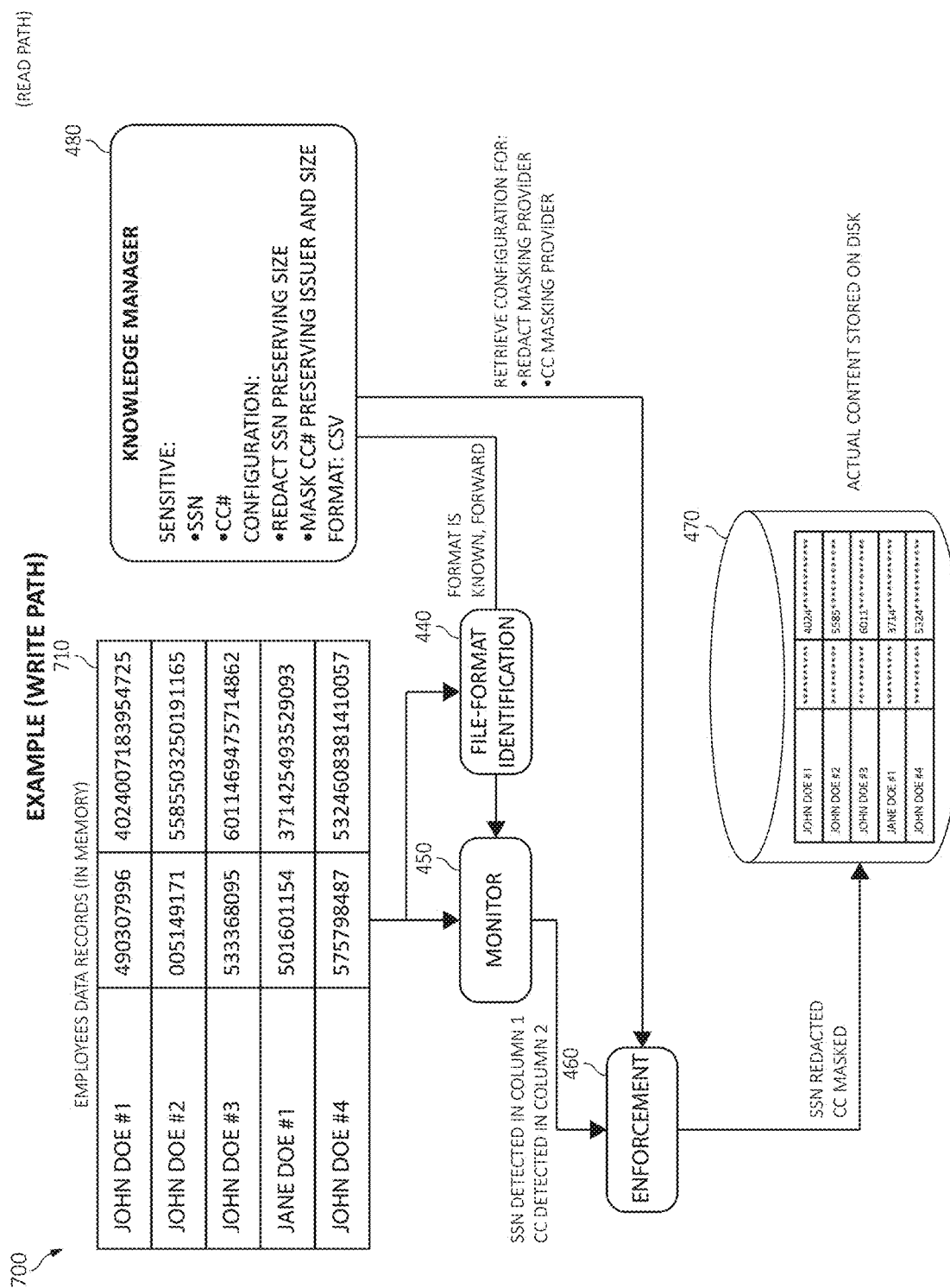
FIG. 7 an additional block diagram depicting an example of preserving data security in a shared computing file system for a write operation in accordance with aspects of the present invention.

In view of the foregoing, consider the following operation example illustrated in FIGS. 5-7 of the implementation of the aforementioned functionality. Turning now to FIG. 5, an exemplary operation for preserving data security in a shared computing file system for a write operation is depicted, in which various aspects of the illustrated embodiments may be implemented. Also, one or more components, functionalities, and/or features of FIGS. 1-4 may be implemented in FIG. 5. Repetitive description of like elements, components, modules, services, applications, and/or functions employed in other embodiments described herein is omitted for sake of brevity.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing.

An application 510 writing data (e.g., "write path") may interact with one or more components of FIG. 4 responsible to persist data to a file system (operating software "OS," client application, etc.). In step 1, a client 512, associated with the application 510, may send data to a computing system which invokes the monitor component 450 and the file-format identification component 440. In step 2, the file-format identification component 440 queries the knowledge manager 480 about data format information related to a file to be written, if available, and/or the file-format identification component 440 computes such information by inspecting available data and metadata. In step 3, the file-format identification component 440 sends the inferred information to the monitor component 450 and the knowledge manager 480 if the information was not previously available. In step 4, the monitor component 450 may retrieves one or more definitions of classified/private data/content (e.g., personal, sensitive, proprietary information) from the knowledge manager 480. In step 5, if the monitor component 450 does not detect any classified/private data/content, the monitor component 450 may forward the data to a computing storage system such as, for example, data storage 470. In step 6, if the monitor component 450 does detect classified/private data content (e.g., personal, sensitive, proprietary information), the enforcement component 460 may be invoked to process the data. In step 7, the enforcement component 460 may retrieve one or more security policies and providers configuration from the knowledge manager 480. In step 8, the enforcement component 460 may transform (e.g., filter, anonymize, replace, data mask, etc.) thereby filtering and preserving the classified/private/sensitive content/data information according to the retrieved policies and configuration. The enforcement component 460 may forward/send the data to the data storage 470.

Turning now to FIG. 6, an exemplary operation for preserving data security in a shared computing file system for a read operation is depicted, in which various aspects of the illustrated embodiments may be implemented. Also, one or more components, functionalities, and/or features of FIGS. 1-4 may be implemented in FIG. 6. Similar to FIG. 5, the various blocks of functionality are depicted with arrows designating the blocks' 600 relationships with each other and to show process flow. Repetitive description of like elements, components, modules, services, applications, and/ or functions employed in other embodiments described herein is omitted for sake of brevity.

An application 610 reading data (e.g., "read path") may interact with one or more components of FIG. 4 responsible to persist data to a file system (operating software "OS," client application, etc.). In step 1, a client 612, associated with the application 610, may request data from a computing storage system such as, for example, data storage 470, which invokes the monitor component 450 and the file-format identification component 440. In step 2, the file-format identification component 440 queries the knowledge manager 480 about data format information related to a file to be read, if available, and/or the file-format identification component 440 computes such information by inspecting available data and metadata. In step 3, the file-format identification component 440 may send the inferred information to the monitor component 450 and the knowledge manager 480 if the information was not previously available. In step 4, the monitor component 450 may retrieve one or more definitions of classified/private data/content (e.g., personal, sensitive, proprietary information) from the knowledge manager 480.

In step 5, if the monitor component 450 does not detect any classified/private data/content, the monitor component 450 may forward the data to a computing storage system such as, for example, data storage 470. In step 6, if the monitor component 450 does detect classified/private data/content (e.g., personal, sensitive, proprietary information), the enforcement component 460 may be invoked to process the data. In step 7, the enforcement component 460 may retrieve one or more security policies and a provider(s) configuration from the knowledge manager 480. In step 8, the enforcement component 460 may transform (e.g., filter, anonymize, replace, data mask, etc.) thereby filtering and preserving the classified/private/sensitive content/data information according to the retrieved policies and configuration. The enforcement component 460 may forward/send the data to the data storage 470.

Turning now to FIG. 6, an additional exemplary operation for preserving data security in a shared computing file system for a read operation is depicted, in which various aspects of the illustrated embodiments may be implemented. Also, one or more components, functionalities, and/or features of FIGS. 1-4 may be implemented in FIG. 7. Similar to FIG. 5, the various blocks of functionality are depicted with arrows designating the blocks' 700 relationships with each other and to show process flow. Repetitive description of like elements, components, modules, services, applications, and/or functions employed in other embodiments described herein is omitted for sake of brevity.

Table 710 is illustrated containing data such as, for example, classified/private data (e.g., personal, sensitive, proprietary information). For example, the data in table 710 may include a name (e.g., John Doe 1-4 and Jane Doe 1), financial data (e.g., credit card "CC" data), and personal identification data (e.g., a social security number "SSN"). Given the desire, interest, and intent to preserve such sensitive, personal, or private information data, the file-format identification component 440 queries the knowledge manager 480 about data format information related to a file to be written such as, for example, the personal identification data, the financial data. The file-format identification component 440 determines such information is considered "sensitive" by inspecting available data and metadata. The file-format identification component 440 then sends, to the monitor component 450, the information that identifies data of table 710 that are deemed classified/private data (e.g., personal, sensitive, proprietary information).

The monitor component 450 detects column 1 of Table 710 contains personal identification information and column 2 of Table 710 contains financial data, each of which are deemed as classified/private data/content (e.g., "sensitive"). The enforcement component 460 is then invokes and may retrieve one or more security policies and providers configuration from the knowledge manager 480. That is, configuration information is retrieved from the knowledge manager 480 by the enforcement component 460 that indicates to transform (e.g., filter, anonymize, replace, data mask, etc.) the data in column 1 (e.g., personal data) and data in column 2 (e.g., financial data) thereby filtering and preserving the classified/private/sensitive content/data information according to the retrieved policies and configuration. The transformed data. The enforcement component 460 may forward/send the transformed data to the data storage 470. Thus, the data from column 1 is entirely transformed (e.g., completely filtered, anonymized, replaced, data masked, etc.) and the data from column 2 is partially transformed (e.g., partially filtered, anonymized, replaced, data masked, etc.). Since the knowledge manager 480 did not indicate "name" data is not deemed as classified/private data/content (e.g., "sensitive") nor any configuration requirements for the name data, the name data (e.g., John Doe 1-4 and Jane Doe 1) are each written to the data storage 470 without transforming (e.g., filter, anonymized, replaced, data masked, etc.). For example, the actual data content stored in the data storage (e.g., on a disk) may now be saved as John Doe #1 in the data storage 470, with personal data (e.g., personal identification information "PII") indicated by "********," and financial data shown as "4024************."

Figure 8:
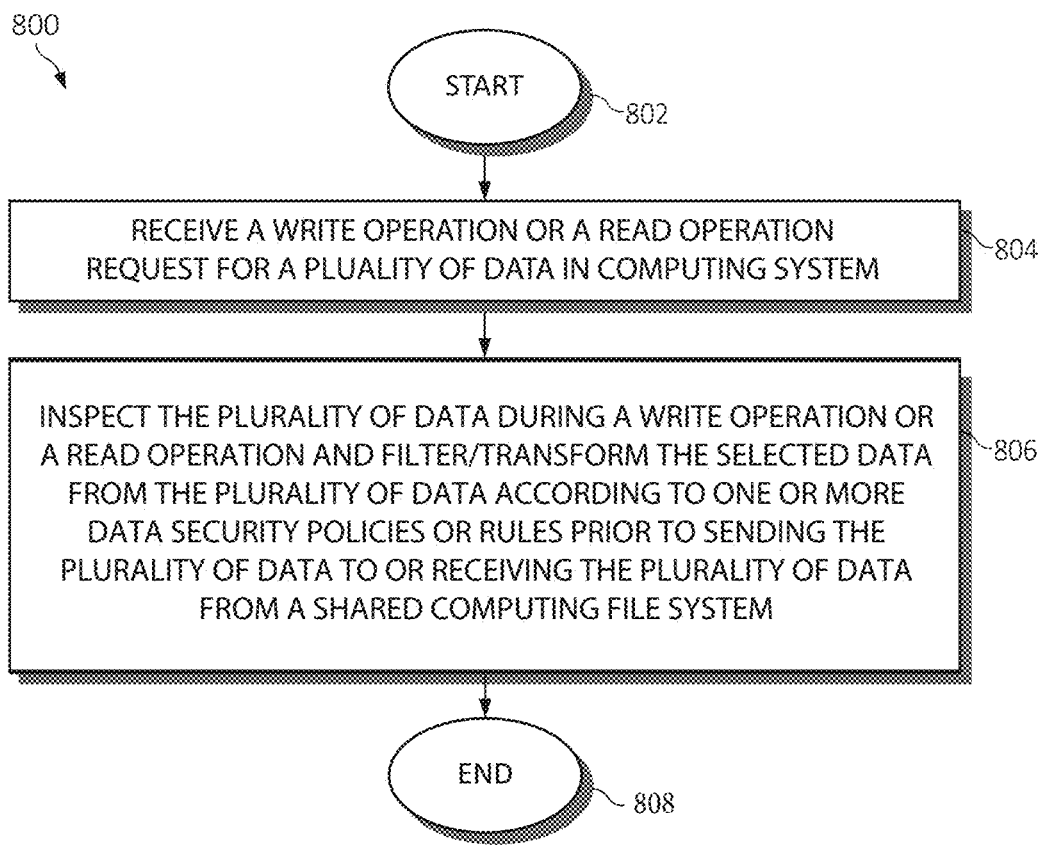
FIG. 8 is a flowchart diagram depicting an exemplary method for preserving data security in a shared computing file system in a computing environment in a computing environment in which aspects of the present invention may be realized.

Turning now to FIG. 8, a method 800 for linking of anonymized datasets in a computing environment is depicted, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 800 may start in block 802.

A write operation and/or a read operation request for data in computing system may be received, as in block 804. The data may be inspected during the write operation or the read operation and selected data from the data may be filtered/transformed according to one or more data security policies or rules prior to sending the plurality of data to or receiving the plurality of data from a shared computing file system, as in block 806. That is, the one or more data security policies or rules may be implicated to transform (e.g., anonymized, replaced, filtered, data masked, etc.) the selected data according to the one or more data security policies or rules. The functionality 800 may end in block 808.

In one aspect, in conjunction with and/or as part of at least one block of FIG. 8, the operations 800 may include one or more of each of the following. The operations of 800 may intercept and/or inspect the selected data prior to performing the write operation or the read operation in the shared computing file system. The operations of 800 may determine or infer data format information of the selected data relating to the write operation or the read operation, and/or determine the selected data relating to the write operation or the read operation implicates the one or more data security policies or rules.

The operations of 800 may replace the selected data with anonymized data according to the one or more data security policies or rules, and/or filter the selected data relating to the write operation or the read operation according to the one or more data security policies or rules.

The operations of 800 may define the one or more data security policies or rules to include types and formats of data for preserving data security, define the one or more data security policies or rules to one or more operations to perform for preserving data security, and/or apply the one or more data security policies or rules to the write operation or the read operation using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing data security in a computing environment, comprising:
   receiving a file system call from an application to perform a write operation or a read operation associated with a plurality of data;
   inspecting the plurality of data associated with the file system call and filtering selected data from the plurality of data according to one or more data security policies or rules prior to sending the plurality of data to or receiving the plurality of data from a shared computing file system, wherein the data is inspected according to data format information identified by examining a system configuration including a file name or extension of the plurality of data, the inspecting invoking a file format-specific processor to examine the plurality of data based on the data format information, and wherein, when the data format information is unable to be ascertained by examining the system configuration, the data format information is identified by inferences deduced by a cognitive computing component upon the cognitive computing component inspecting the plurality of data.

2. The method of claim 1, further including intercepting the selected data prior to performing the write operation or the read operation in the shared computing file system.

3. The method of claim 1, further including determining the selected data relating to the write operation or the read operation implicates the one or more data security policies or rules.

4. The method of claim 1, further including replacing the selected data with anonymized data according to the one or more data security policies or rules.

5. The method of claim 1, further including filtering the selected data relating to the write operation or the read operation according to the one or more data security policies or rules.

6. The method of claim 1, further including:
   defining the one or more data security policies or rules to include types and formats of data;
   defining the one or more data security policies or rules to one or more operations to perform; and
   applying the one or more data security policies or rules to the write operation or the read operation using a machine learning operation.

7. A system providing data security in a computing environment, comprising:
   one or more computers with executable instructions that when executed cause the system to:
      receive a file system call from an application to perform a write operation or a read operation associated with a plurality of data;
      inspect the plurality of data associated with the file system call and filter selected data from the plurality of data according to one or more data security policies or rules prior to sending the plurality of data to or receiving the plurality of data from a shared computing file system, wherein the data is inspected according to data format information identified by examining a system configuration including a file name or extension of the plurality of data, the inspecting invoking a file format-specific processor to examine the plurality of data based on the data format information, and wherein, when the data format information is unable to be ascertained by examining the system configuration, the data format information is identified by inferences deduced by a cognitive computing component upon the cognitive computing component inspecting the plurality of data.

8. The system of claim 7, wherein the executable instructions intercept and inspect the selected data prior to performing the write operation or the read operation in the shared computing file system.

9. The system of claim 7, wherein the executable instructions determine the selected data relating to the write operation or the read operation implicates the one or more data security policies or rules.

10. The system of claim 7, wherein the executable instructions replace the selected data with anonymized data according to the one or more data security policies or rules.

11. The system of claim 7, wherein the executable instructions filter the selected data relating to the write operation or the read operation according to the one or more data security policies or rules.

12. The system of claim 7, wherein the executable instructions:
   define the one or more data security policies or rules to include types and formats of data;
   define the one or more data security policies or rules to one or more operations to perform; and
   apply the one or more data security policies or rules to the write operation or the read operation using a machine learning operation.

13. A computer program product for, by a processor, linking of anonymized datasets in a computing environment, the computer program product comprising a non-transitory computer-readable storage medium having computer-readable program code portions stored therein, the computer-readable program code portions comprising:
   an executable portion that receives a file system call from an application to perform a write operation or a read operation associated with a plurality of data;
   an executable portion that inspects the plurality of data associated with the file system call and filters selected data from the plurality of data according to one or more data security policies or rules prior to sending the plurality of data to or receiving the plurality of data from a shared computing file system, wherein the data is inspected according to data format information identified by examining a system configuration including a file name or extension of the plurality of data, the inspecting invoking a file format-specific processor to examine the plurality of data based on the data format information, and wherein, when the data format information is unable to be ascertained by examining the system configuration, the data format information is identified by inferences deduced by a cognitive computing component upon the cognitive computing component inspecting the plurality of data.

14. The computer program product of claim 13, further including an executable portion that intercepts and inspects the selected data prior to performing the write operation or the read operation in the shared computing file system.

15. The computer program product of claim 13, further including an executable portion that determines the selected data relating to the write operation or the read operation violates the one or more data security policies or rules.

16. The computer program product of claim 13, further including an executable portion that:

replaces the selected data with anonymized data according to the one or more data security policies or rules; or filters the selected data relating to the write operation or the read operation according to the one or more data security policies or rules.

17. The computer program product of claim 13, further including an executable portion that:

defines the one or more data security policies or rules to include types and formats of data;

defines the one or more data security policies or rules to one or more operations to perform; and applies the one or more data security policies or rules to the write operation or the read operation using a machine learning operation.

* * * * *